US008333217B2

(12) United States Patent
Raper et al.

(10) Patent No.: US 8,333,217 B2

(45) Date of Patent: Dec. 18, 2012

(54) FAULT-TOLERANT BLEED VALVE ASSEMBLY

(75) Inventors: Kevin Scott Raper, Madison, MS (US); Phillip Wayne Galloway, Madison, MS (US)

(73) Assignee: Eaton Corporation, Cleveland, OH (US)

( * ) Notice: Subject to any disclaimer, the term of this patent is extended or adjusted under 35 U.S.C. 154(b) by 935 days.

(21) Appl. No.: 12/128,072

(22) Filed: May 28, 2008

(65) Prior Publication Data

US 2009/0293965 A1 Dec. 3, 2009

(51) Int. Cl.
*F16K 37/00* (2006.01)

(52) U.S. Cl. ... 137/557; 137/202; 137/613; 251/129.15; 250/903

(58) Field of Classification Search .................. 137/557, 137/177, 197, 199, 202, 613, 513.5; 251/129.15; 250/903
See application file for complete search history.

(56) References Cited

U.S. PATENT DOCUMENTS 2,544,476 A 3/1951 Venning
2,635,620 A 4/1953 Deardorff
2,729,228 A 1/1956 Stevenson
3,081,788 A 3/1963 Lewis
3,323,546 A 6/1967 Lord
3,948,147 A 4/1976 Sauer et al.
4,524,793 A 6/1985 Silverwater
4,715,398 A 12/1987 Shouldice et al.
4,813,446 A 3/1989 Silverwater et al.
4,951,701 A 8/1990 Boehmer
4,976,754 A 12/1990 Edelstein et al.
5,033,646 A 7/1991 McCann et al.
5,213,586 A * 5/1993 Welker ............................ 48/195
5,305,793 A 4/1994 Cencula
5,579,803 A * 12/1996 Welker .......................... 137/202
5,785,100 A 7/1998 Showalter et al.
6,047,720 A * 4/2000 Stein ............................ 137/199
7,000,628 B2 * 2/2006 Ruesch et al. .................... 137/2
7,163,188 B1 * 1/2007 Sisk ........................ 251/129.19
2010/0319791 A1 12/2010 Dirkin et al.

FOREIGN PATENT DOCUMENTS

DE 199 39 970 3/2001
DE 100 63 330 7/2001
FR 2 717 759 9/1995
FR 2 897 123 8/2007
WO WO 2009/124009 10/2009

OTHER PUBLICATIONS

Engineered Sensors—Tedeco Products , "Liquid Level Sensors," http://www.tedecoindustrial.com/liq.htm (last visited Mar. 27, 2008).
International Search Report and Written Opinion mailed Nov. 5, 2009.

* cited by examiner

*Primary Examiner* — Craig Schneider
*Assistant Examiner* — Ian Paquette
(74) *Attorney, Agent, or Firm* — Merchant & Gould P.C.

(57) ABSTRACT

A bleed valve assembly includes a control assembly having a fluid inlet and a fluid outlet. The control assembly defines a fluid passageway in fluid communication with the fluid inlet and the fluid outlet. An electromechanical valve is engaged with the control assembly. The electromechanical valve provides selective fluid communication between the passageway and the fluid outlet. A fluid sensor is in fluid communication with the passageway. The fluid sensor includes a sensing tip and is in electrical communication with the electromechanical valve. A valve is disposed in the passageway of the control assembly. The valve prevents fluid communication of non-gaseous fluid between the fluid inlet and the fluid outlet.

22 Claims, 8 Drawing Sheets

FAULT-TOLERANT BLEED VALVE ASSEMBLY

BACKGROUND

The versatility and flexibility of hydraulic systems give it many advantages over other methods of transmitting power. However, like many power systems, proper care of the hydraulic system must be taken in order to prevent problems.

A typical problem that can occur in hydraulic systems is aeration. Aeration in hydraulic systems is commonly caused by air entering the hydraulic system through a leak in an inlet line or as a result of a low fluid level in the reservoir. If the air in the fluid of the hydraulic system is not released, the air will implode against components of the pump. This implosion of air releases large amounts of energy that can result in damage to the pump, which over time can result in premature failure of the pump.

While prior art air-vent valves have been used to release air in the hydraulic system, such valves do not protect against hydraulic leakage from the valve as a result of a valve component failure. Leakage in hydraulic systems can be problematic since it drains the hydraulic system of hydraulic fluid. As the hydraulic fluid of the hydraulic system decreases, the fluid level in the reservoir decreases. As previously stated, the risk of aeration in the hydraulic system increases as the amount of hydraulic fluid in the hydraulic system decreases, which potentially decreases the life of the components of the hydraulic system.

SUMMARY

An aspect of the present disclosure relates to a bleed valve assembly. The bleed valve assembly includes a control assembly having a fluid inlet, a fluid outlet and a fluid passageway in fluid communication with the fluid inlet and the fluid outlet. An electromechanical valve is disposed is the control assembly. The electromechanical valve provides selective fluid communication between the passageway and the fluid outlet. A fluid sensor is in fluid communication with the passageway. The fluid sensor includes a sensing tip and is in electrical communication with the electromechanical valve. A valve assembly is disposed in the passageway of the control assembly. The valve prevents fluid communication of non-gaseous fluid between the fluid inlet and the fluid outlet.

Another aspect of the present disclosure relates to a bleed valve assembly for a hydraulic system. The bleed valve assembly includes a control assembly that has a fluid inlet and a fluid outlet. The control assembly includes a first housing and a second housing. The first and second housings cooperatively define a passageway that is in fluid communication with the fluid inlet and the fluid outlet. The first housing defines a first portion of the passageway while the second housing defines a second portion of the passageway. A fluid sensor is disposed in the first housing. The fluid sensor includes a sensing tip that is at least partially disposed in the first portion of the passageway. A solenoid valve is disposed in the second housing. The solenoid valve includes an armature that is selectively disposed in the second portion of the passageway. The armature provides selective fluid communication between the passageway and the fluid outlet. A valve assembly is disposed between the first housing and the second housing. The valve assembly includes a float member and a valve seat having a fluid passage through the valve seat. The float member is adapted to prevent non-gaseous fluid from contacting the solenoid valve by blocking the flow of non-gaseous fluid through the fluid passage of the valve seat.

Another aspect of the present disclosure relates to a hydraulic system. The hydraulic system includes a fluid reservoir. The hydraulic system further includes a passageway. The passageway is in fluid communication with the upper portion of the fluid reservoir. A fluid sensor includes a sensing tip that is in fluid communication with the passageway. The fluid sensor is disposed downstream of the fluid reservoir. An electromechanical valve is disposed downstream of the fluid sensor. The electromechanical valve includes an armature that is selectively disposed in the passageway. The armature is adapted to selectively vent gaseous fluid in the passageway in response to an electrical signal from the fluid sensor. A back-up valve assembly is disposed in the passageway between the fluid sensor and the electromechanical valve. The back-up valve assembly includes a valve seat and a float member. The valve seat and the float member are adapted to prevent non-gaseous fluid from flowing downstream of the back-up valve assembly.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
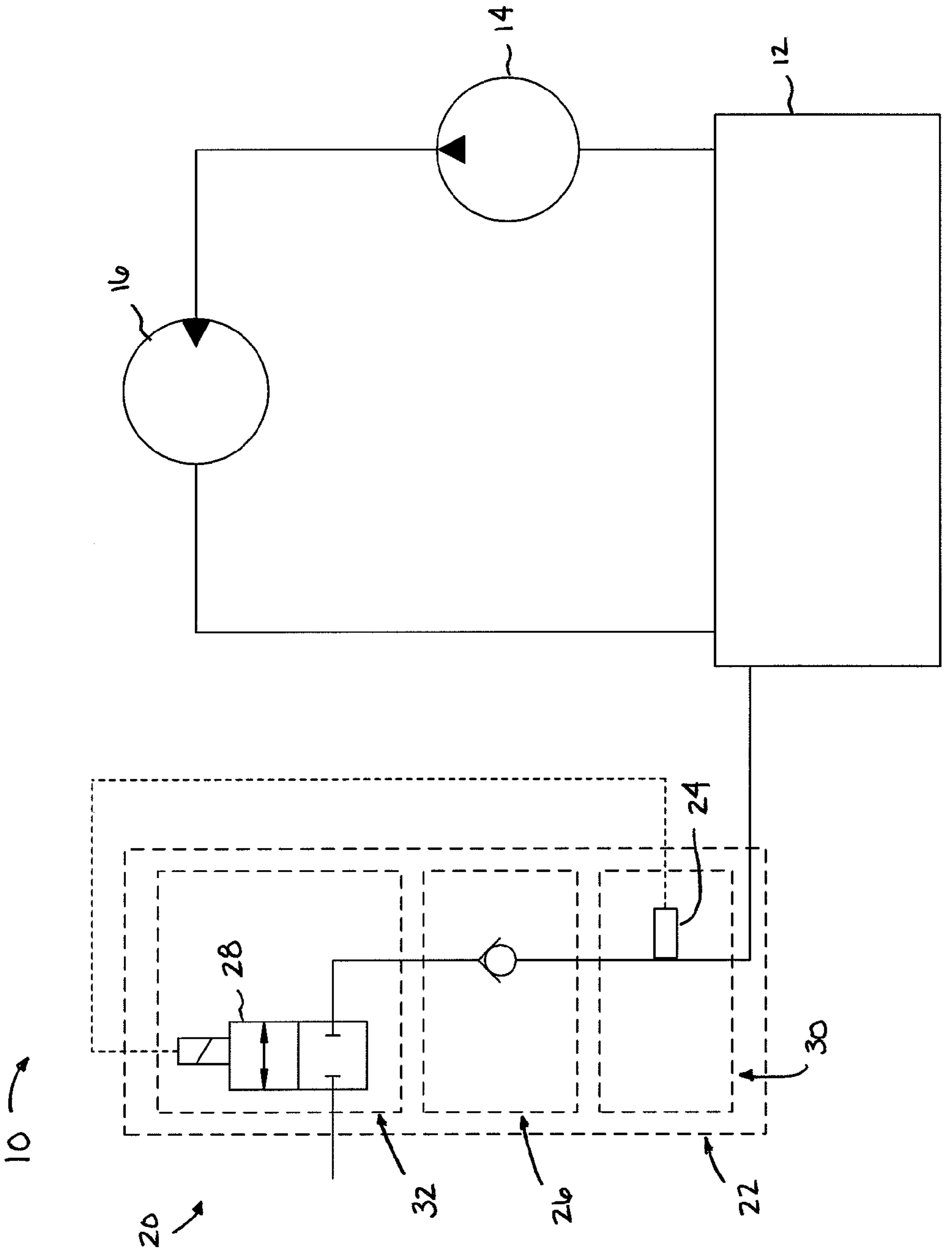
FIG. 1 is a schematic of a hydraulic system having features that are examples of aspects in accordance with the principles of the present disclosure.

Referring now to FIG. 1, a schematic representation of a simplified hydraulic system, generally designated 10, is shown. The hydraulic system 10 includes a reservoir 12, a pump 14, an actuator 16, which is shown herein as a motor, and a bleed valve assembly, generally designated 20. In one embodiment, the hydraulic system 10 is disposed on an aerospace application such as an aircraft.

In the subject embodiment, the reservoir 12 provides a receptacle for holding fluid for the hydraulic system 10. A fluid inlet of the pump 14 and a fluid outlet of the actuator 16 are in fluid communication with the reservoir 12.

As previously stated, a typical problem in hydraulic systems is the presence of air in the hydraulic fluid of the hydraulic system. If this air in the hydraulic fluid of the hydraulic system 10 is not released, the air may implode against components of the pump 14, thereby resulting in potentially damage to the pump 14.

In the subject embodiment, the bleed valve assembly 20 is adapted to detect and relieve air in the hydraulic system 10. In the depicted embodiment of FIG. 1, the bleed valve assembly 20 is in fluid communication with a top portion of the reservoir 12.

Figure 2:
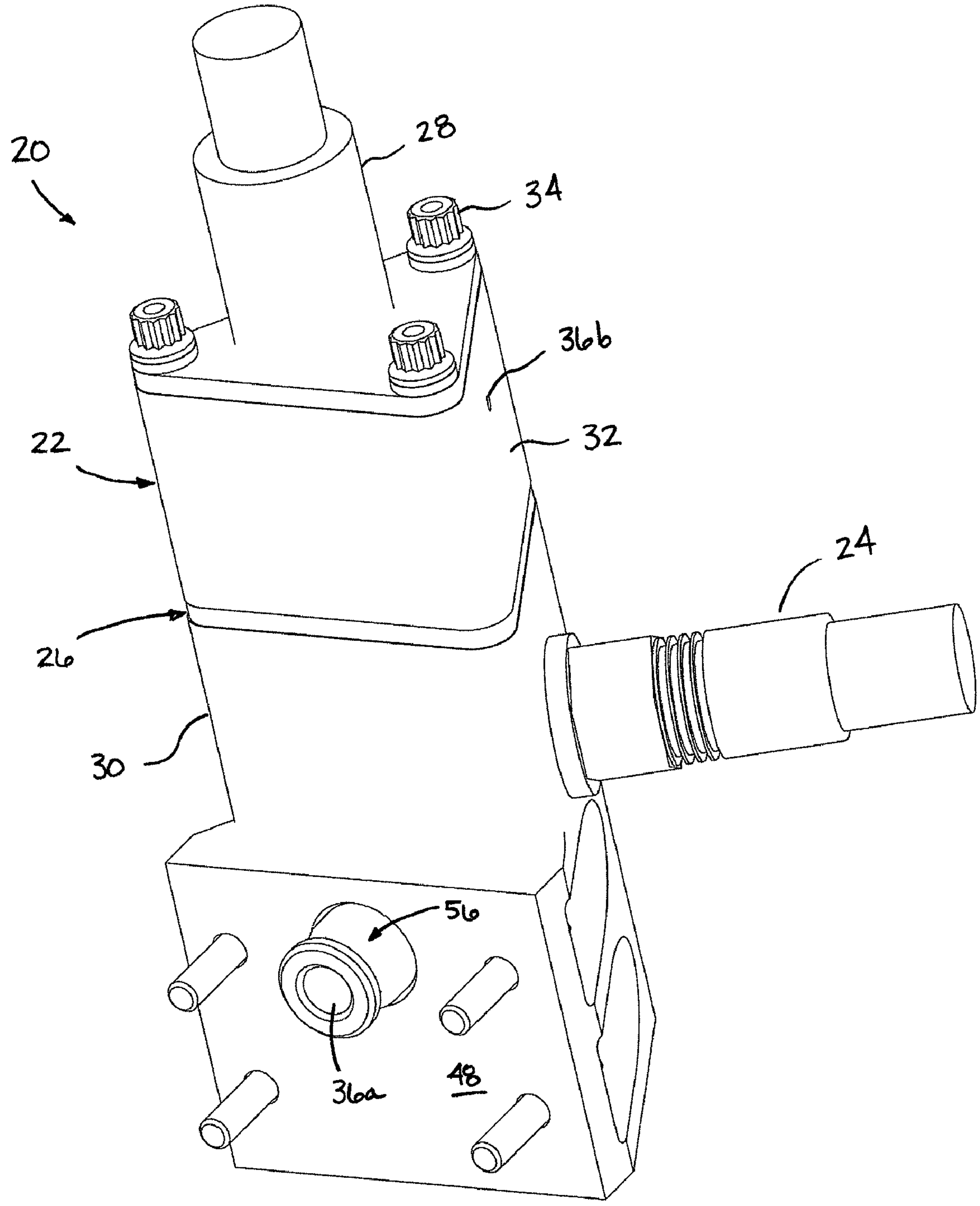
FIG. 2 is a perspective view of a bleed valve assembly suitable for use in the hydraulic system of FIG. 1.
Figure 3:
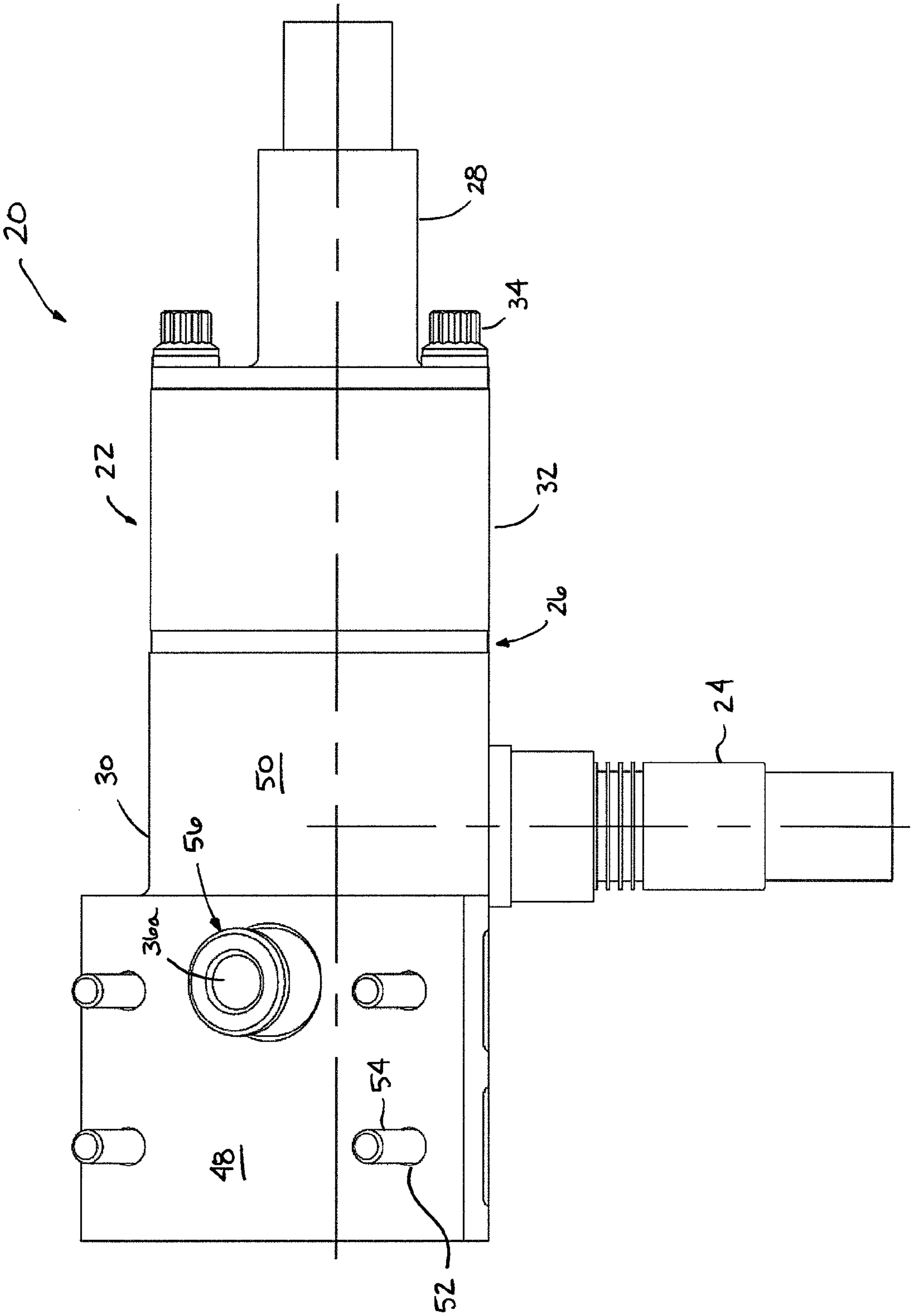
FIG. 3 is a front view of the bleed valve assembly of FIG. 2.
Figure 4:
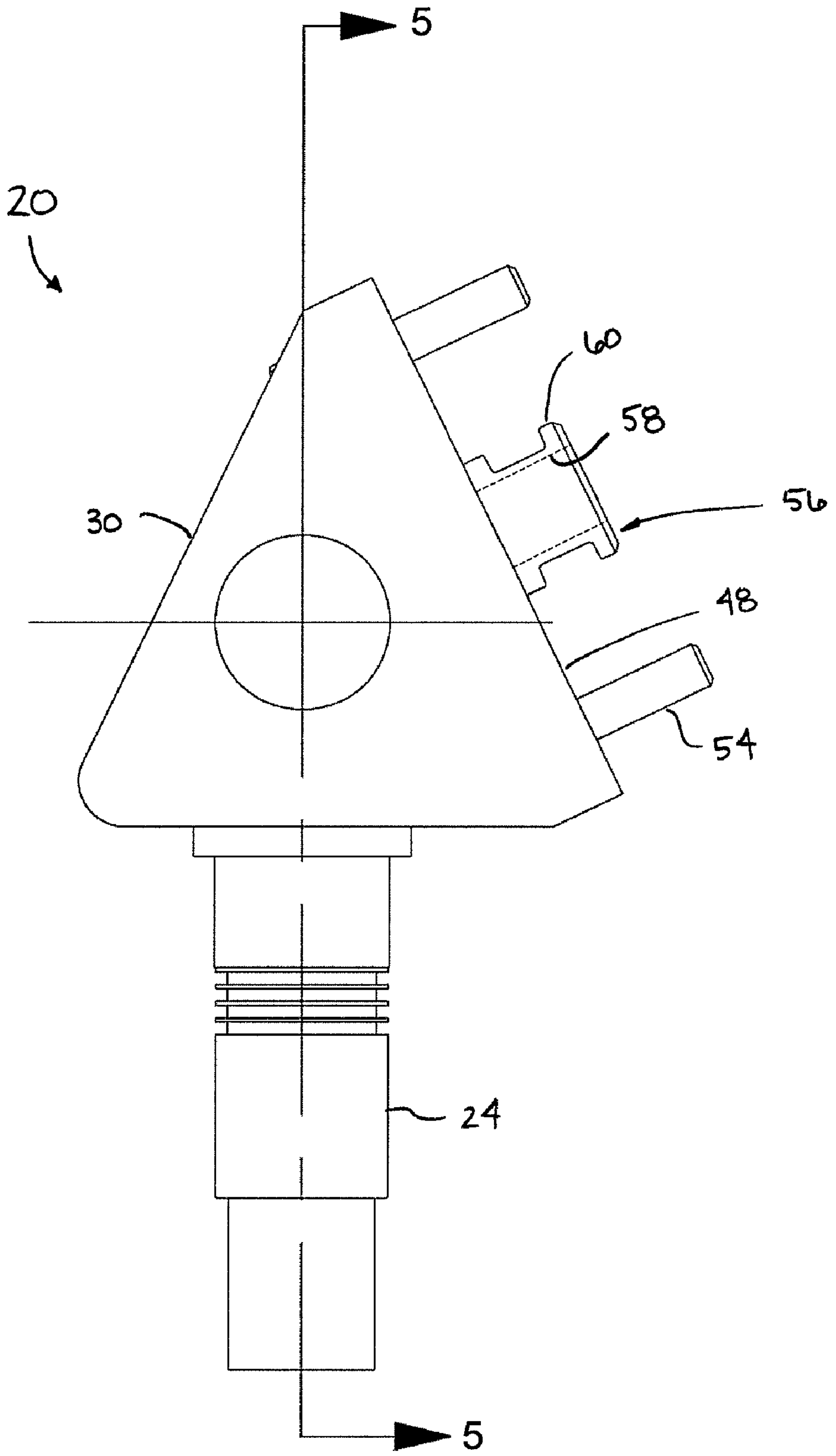
FIG. 4 is a left side view of the bleed valve assembly of FIG. 2.

Referring now to FIGS. 1 and 2, an embodiment of the bleed valve assembly 20 is shown. The bleed valve assembly 20 includes a control assembly, generally designated 22. The control assembly 22 includes a fluid sensor 24, a valve assembly, generally designated 26, and an electromechanical valve 28, each of which will be described in greater detail subsequently.

Referring now to FIGS. 2-5, the control assembly 22 includes a first housing 30 and a second housing 32. In the subject embodiment, the first and second housings 30, 32 are held together in tight sealing engagement by a plurality of fasteners 34 (e.g., bolts, screws, etc.). It will be understood, however, that the scope of the present disclosure is not limited to the first and second housings 30, 32 being in tight sealing engagement as the first and second housings 30, 32 could be separately disposed in the control assembly 22.

Each of the first and second housings 30, 32 defines a fluid port 36 for receiving or discharging fluid. In the subject embodiment, the first housing 30 defines a fluid inlet port 36*a* for receiving fluid while the second housing 32 defines a fluid outlet port 36*b* for discharging fluid. The first and second housings 30, 32 of the control assembly 22 further define a fluid passageway 38 that provides fluid communication between the fluid inlet and outlet ports 36*a*, 36*b*.

In the subject embodiment, the first housing 30 defines a first portion 40 of the fluid passageway 38. The first portion 40 of the fluid passageway 38 extends from the fluid inlet port 36*a* to a first cavity 42 in an end surface 44 of the first housing 30. In the subject embodiment, the first cavity 42 has a larger diameter than the first portion 40 of the fluid passageway 38.

The first housing 30 includes a sensor port 46. The sensor port 46 is in fluid communication with the first portion 40 of the fluid passageway 38 between the fluid inlet port 36*a* and the first cavity 42. The sensor port 46 is adapted to receive the fluid sensor 24. In one embodiment, the sensor port 46 includes a plurality of internal threads that are adapted to receive a plurality of external threads on the fluid sensor 24.

The first housing 30 further includes a mount 48. The mount 48 is adapted for mounting the bleed valve assembly 20 to the reservoir 12. In the subject embodiment, the mount 48 extends outwardly from a side 50 of the first housing 30. The mount 48 defines a plurality of holes 52 that extends through the mount 48 and is adapted for receiving a plurality of mounting fasteners 54. In the subject embodiment, and by way of example only, the mount 48 includes four holes 52.

The mount 48 of the first housing 30 further includes a connector 56 that is engaged with the fluid inlet port 36*a*. In the subject embodiment, the engagement between the connector 56 and the fluid inlet port 36*a* is a threaded engagement. The connector 56 defines a passage 58 (shown with dashed lines in FIG. 4) through the center of the connector 56 that is in fluid communication with the fluid inlet port 36*a*. The connector 56 includes an exterior surface 60 that is adapted for receipt in a port on the reservoir 12.

The second housing 32 defines a second portion 62 of the fluid passageway 38. The second portion 62 of the fluid passageway 38 extends from the fluid outlet port 36*b* to a second cavity 64 in an end surface 66 of the second housing 32. In the subject embodiment, the second cavity 64 has an inner diameter that is about equal to the inner diameter of the first cavity 42 in the first housing 30 and that is generally larger than the inner diameter of the second portion 62 of the fluid passageway 38.

The second housing 32 includes a valve port 68. The valve port 68 is in fluid communication with the second portion 62 of the fluid passageway 38 between the fluid outlet port 36*b* and the second cavity 64. The valve port 68 is adapted to receive the electromechanical valve 28.

Figure 5:
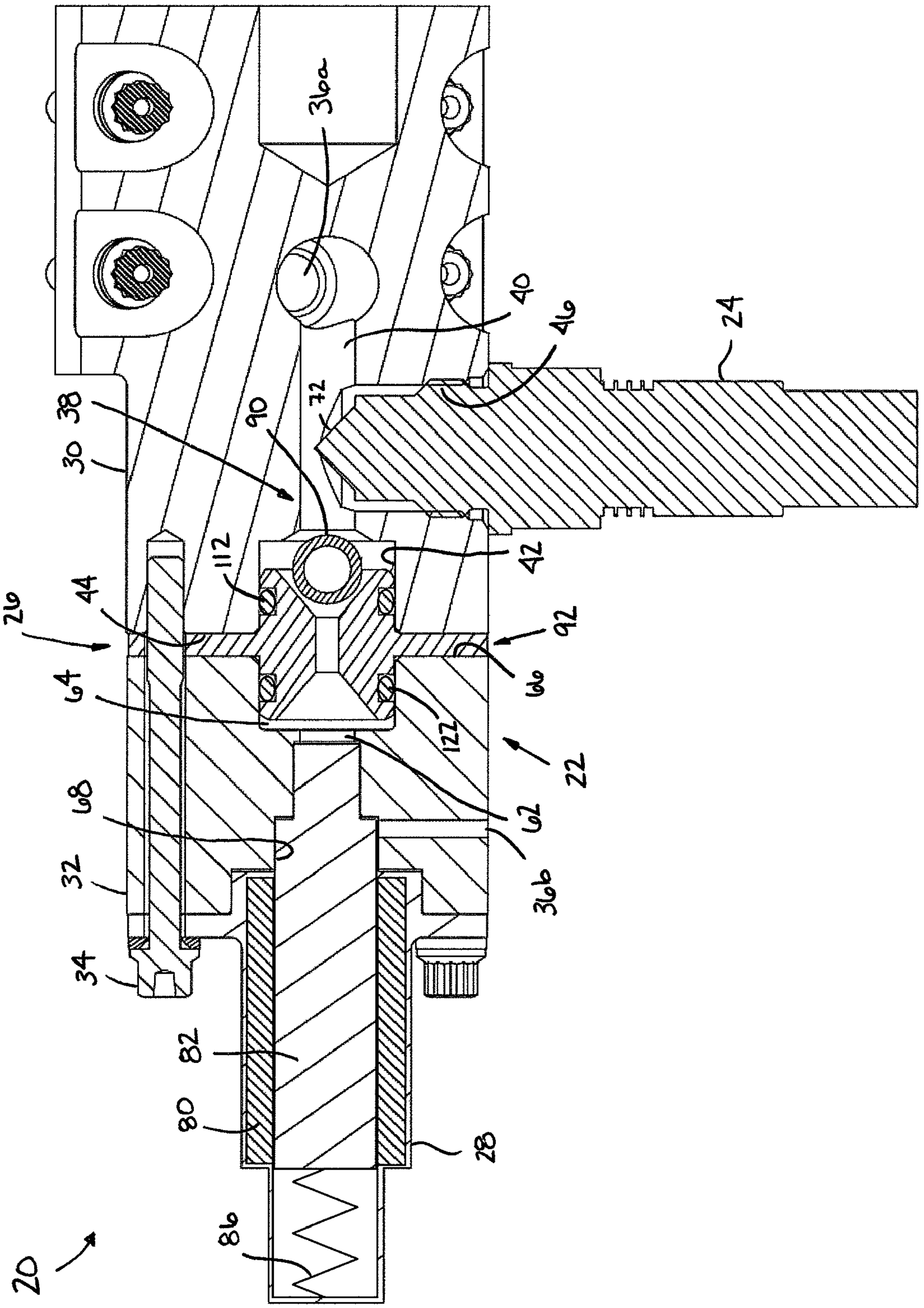
FIG. 5 is a cross-sectional view of the bleed valve assembly taken on line 5-5 of FIG. 4.
Figure 6:
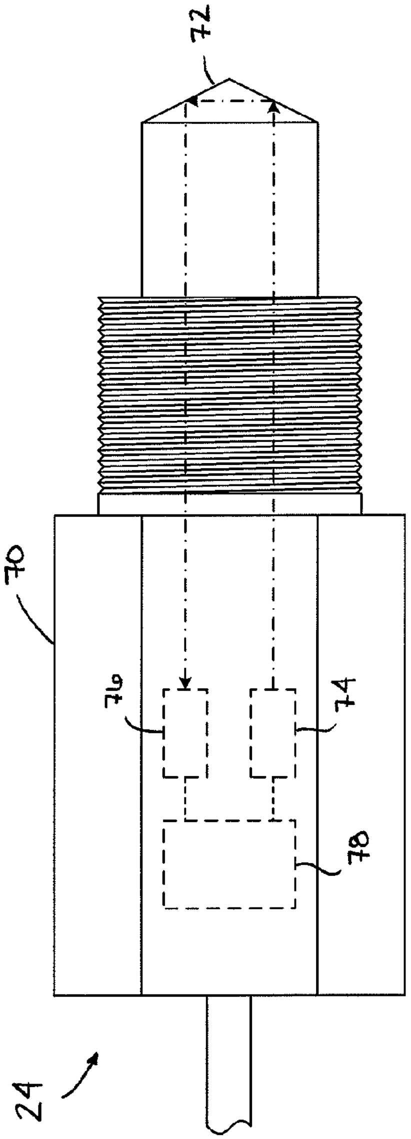
FIG. 6 is a schematic representation of a first light path in an electro-optic sensor suitable for use in the hydraulic system of FIG. 1.
Figure 7:
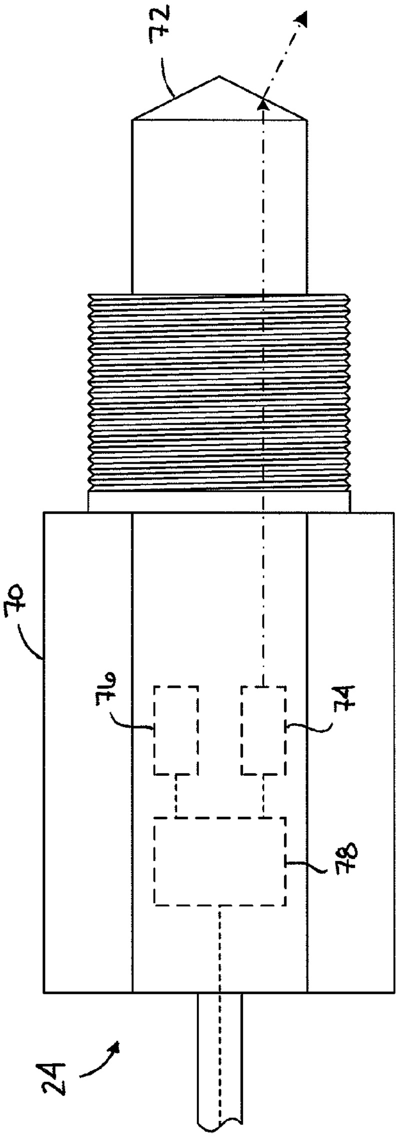
FIG. 7 is a schematic representation of a second light path in the electro-optic sensor.

Referring now to FIGS. 5-7, the fluid sensor 24 will be described. The fluid sensor 24 is an electro-optic sensor. Fluid sensors 24 suitable for use with the bleed valve assembly 20 are sold commercially by Eaton-Tedeco as Intellisense LevelPro Series Liquid Level Sensors.

The fluid sensor 24 includes a body 70 having a sensing tip 72. The sensing tip 72 is made of a transparent material (e.g., glass, plastic, etc.) and is shaped generally as a prism. In the subject embodiment, the sensing tip 72 of the fluid sensor 24 is at least partially disposed in the first portion 40 of the fluid passageway 38.

A light source (e.g., light emitting diode, etc.) 74, a light receiver 76 and a microprocessor 78 are disposed in an inner cavity of the body 70 of the fluid sensor 24. The light source 74 transmits light to the sensing tip 72. If the sensing tip 72 is disposed in non-gaseous fluid, the light emitted from the light source 74 follows a first light path in which the light is reflected back to the light receiver 76 in the inner cavity of the fluid sensor 24 as shown in FIG. 6. If the sensing tip 72 is disposed in gaseous fluid, such as air, the light emitted from the light source 74 follows a second light path in which the light refracts through the sensing tip 72 as shown in FIG. 7.

Referring now to FIG. 5, the electromechanical valve 28 will be described. In the subject embodiment, the electromechanical valve 28 is a solenoid valve having a coil 80 and an armature 82.

At least a portion of the armature 82 is disposed in a bore of the coil 80. The armature 82 includes an end portion 84 that extends outwardly from the bore of the coil 80 and is disposed in second portion 62 of the fluid passageway 38. The end portion 84 of the armature 82 selectively blocks fluid communication between the fluid inlet port 36*a* and the fluid outlet port 36*b* of the bleed valve assembly 20. In the subject embodiment, the armature 82 is biased to a closed position in which the fluid communication between the fluid inlet port 36*a* and the fluid outlet port 36*b* is blocked. In one embodiment, a spring 86 biases the armature 82 to the closed position.

Referring now to FIGS. 5-7, the operation of the fluid sensor 24 and the electromechanical valve 28 will be described. In the subject embodiment, the coil 80 is in selective electrical communication with the microprocessor 78 of the fluid sensor 24. In response to a signal received from the light receiver 76 of the fluid sensor 24, the microprocessor 78 actuates the coil 80 of the electromechanical valve 28 accordingly. For example, if the sensor tip 72 is disposed in gaseous fluid (e.g., air, etc.), the light receiver 76 does not receive light emitted from the light source 74 since the emitted light is refracted out the sensor tip 72. In this situation, the microprocessor 78 of the fluid sensor 24 receives a signal from the light receiver 76 and actuates the coil 80 of the electromechanical valve 28. When the coil 80 is actuated, the armature 82 retracts into the bore of the coil 80 to an open position. With the armature 82 in the open position, the fluid outlet port 36*b* is in open fluid communication with the fluid inlet port 36*a*, thereby allowing fluid in the fluid passageway 38 to flow out the fluid outlet port 36*b*.

If, however, the sensing tip 72 of the fluid sensor 24 is disposed in non-gaseous fluid (e.g., hydraulic fluid, etc.), the light receiver 76 of the fluid sensor 24 receives light emitted from the light source 74 which is reflected off the sensing tip 72 as shown in FIG. 6. In this situation, the microprocessor 78 of the fluid sensor 24 does not actuate the coil 80 of the electromechanical valve 28. As the electromechanical valve 28 is biased to the closed position in which fluid communication between the fluid inlet port 36*a* and the fluid outlet port 36*b* is blocked, the non-gaseous fluid is prevented from being discharged from the fluid outlet port 36*b*.

In the subject embodiment, the microprocessor 78 of the fluid sensor 24 is adapted to interpret signals received from the light receiver 76. For example, the microprocessor 78 can be programmed to identify droplets of fluid on the sensing tip 72, ambient light, and splashing of non-gaseous fluid on the sensing tip 72. This identification reduces or eliminates false operation of the fluid sensor 24 and false operation of the bleed valve assembly 20.

Referring now to FIGS. 5 and 8-10, the valve assembly 26 is shown. In the subject embodiment, the valve assembly 26 provides a back-up or fault tolerant feature to the bleed valve assembly 20. For example, if the armature 82 of the electromechanical valve 28 fails to fully extend from the coil 80 and, therefore, fails to fully block the fluid passageway 38 or if the fluid sensor 24 falsely actuates the coil 80 of the electromechanical valve 28, the valve assembly 26 is adapted to prevent non-gaseous fluid from the reservoir 12 from being discharged through the fluid outlet port 36*b*. This feature is advantageous as it allows the reservoir 12 to retain its volume of fluid in the event of a fluid sensor 24 or electromechanical valve 28 failure. The valve assembly 26 includes a float member 90 and a float seat 92.

In the subject embodiment, the float member 90 is generally spherical in shape and hollow bodied. In the depicted embodiment of FIG. 5, the float member 90 is disposed in the first cavity 42 of the first portion 40 of the fluid passageway 38. In order to retain the float member 90 in the first cavity 42, the outer diameter of the float member 90 is larger than the inner diameter of the first portion 40 of the fluid passageway 38.

Figure 8:
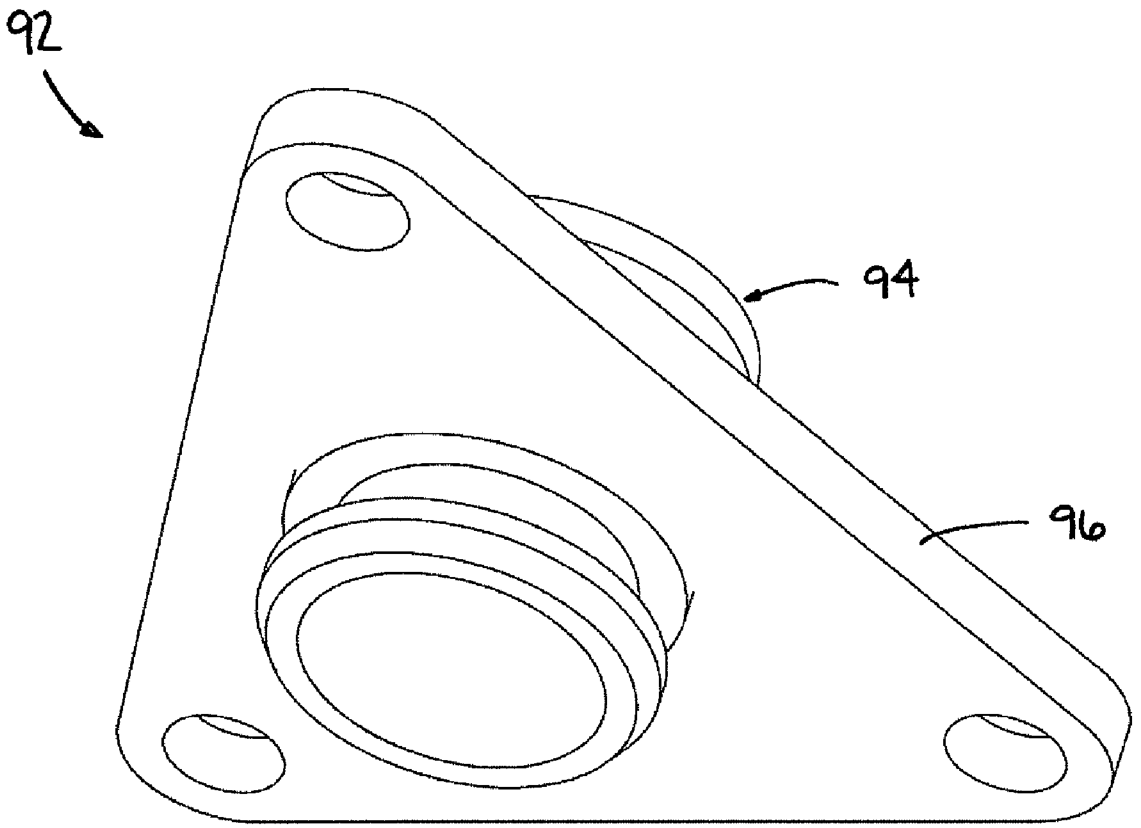
FIG. 8 is a perspective view of a float seat suitable for use in the hydraulic system of FIG. 1.
Figure 10:
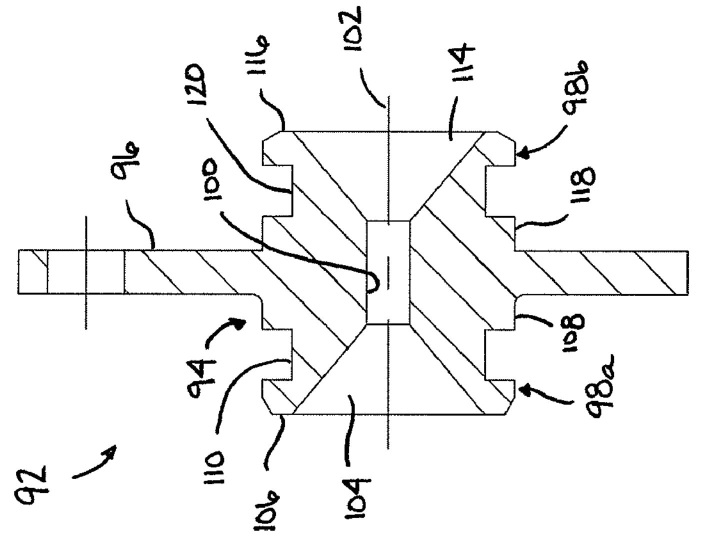
FIG. 10 is a cross-sectional view of the float seat taken on line 10-10 of FIG. 9.
Figure 9:
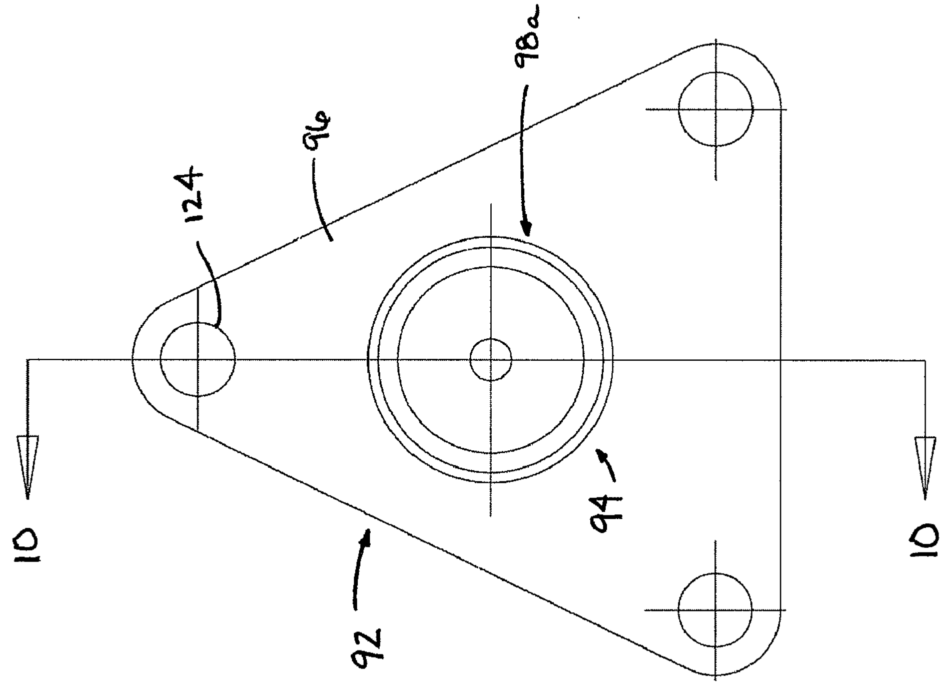
FIG. 9 is a front view of the float seat of FIG. 8.

Referring now to FIGS. 8-10, the float seat 92 is shown. The float seat 92 includes a valve seat 94 and a flange 96.

The valve seat 94 is generally cylindrical in shape and includes a first axial end portion 98*a* and an oppositely disposed second axial end portion 98*b*. The valve seat 94 defines a fluid passage 100 that extends through the first and second axial end portions 98*a*, 98*b* along a longitudinal axis 102 of the valve seat 94. An inner diameter of the fluid passage 100 is smaller than the outer diameter of the float member 90.

The first axial end portion 98*a* of the valve seat 94 defines a first opening 104 to the fluid passage 100. In the subject embodiment, an inner diameter of the first opening 104 tapers from a first axial end surface 106 of the first axial end portion 98*a* to the fluid passage 100. The inner diameter of the first opening 104 at the first axial end surface 106 is larger than the outer diameter of the float member 90 such that the float member 90 can be received within the first opening 104.

A first exterior surface 108 of the first axial end portion 98*a* is sized for receipt in the first cavity 42 of the first housing 30. The first exterior surface 108 of the first axial end portion 98*a* defines a first groove 110. In the subject embodiment, the first groove 110 is adapted to receive a first sealing member 112, such as an o-ring (shown in FIG. 5), which is adapted to provide a fluid seal between the first axial end portion 98*a* and the first cavity 42 of the first housing 30.

The second axial end portion 98*b* of the valve seat 94 defines a second opening 114 to the fluid passage 100. In the subject embodiment, an inner diameter of the second opening 114 tapers from a second axial end surface 116 of the second axial end portion 98*b* to the fluid passage 100.

A second exterior surface 118 of the second axial end portion 98*b* is sized for loose fitting engagement with the second cavity 64 of the second housing 32. The second exterior surface 118 of the second axial end portion 98*b* defines a second groove 120. In the subject embodiment, the second groove 120 is adapted to receive a second sealing member 122, which is adapted to provide a fluid seal between the second axial end portion 98*b* and the second cavity 64 of the second housing 32.

The flange 96 of the float seat 92 extends outwardly from the valve seat 94 in a direction that is generally perpendicular to the longitudinal axis 102. In the subject embodiment, the flange 96 is disposed longitudinally along the valve seat 94 such that the first axial end portion 98*a* and the second axial end portion 98*b* are generally symmetrical. This symmetrical arrangement of the first and second axial end portions 98*a*, 98*b* provides for ease of assembly of the bleed valve assembly 20 as the first and second axial end portions 98*a*, 98*b* will fit in both the first and second cavities 42, 64 of the first and second housings 30, 32.

In the subject embodiment, the flange 96 is adapted for disposition between the end surface 44 of the first housing 30 and the end surface 66 of the second housing 32. The flange 96 defines a plurality of thru-holes 124 that is adapted to receive the plurality of fasteners 34. In the subject embodiment, the outer perimeter of the flange 96 is shaped similarly to the outer perimeter of the first and second housings 30, 32.

Referring now to FIGS. 1 and 5, the operation of the fault tolerant feature of the bleed valve assembly 20 will now be described. Fluid from the reservoir 12 enters the bleed valve assembly 20 through the fluid inlet port 36*a*. The fluid enters the first portion 40 of the fluid passageway 38 and comes into contact with the sensing tip 72 of the fluid sensor 24. If the fluid is gaseous, light from the light source 74 of the fluid sensor 24 is refracted through the sensing tip 72. When the light is refracted through the sensing tip 72, the light receiver 76 sends a signal to the microprocessor 78. In response to the signal from the light receiver 76, the microprocessor actuates the coil 80 of the electromechanical valve 28.

The gaseous fluid in the first portion 40 of the fluid passageway 38 flows around the float member 90 and into the fluid passage 100 of the valve assembly 26. As the float member 90 is a hollowed body member, the pressure of the gaseous fluid is able to raise the float member 90 such that the gaseous fluid can flow around the float member 90 and into the fluid passage 100.

The gaseous fluid then flows into the second portion 62 of the fluid passageway 38. With the coil 80 of the electromechanical valve 28 actuated, the gaseous fluid flows through the second portion 62 and out the fluid outlet port 36*b*.

If the electromechanical valve 28 remains in the open position rather than returning to the closed position when non-gaseous fluid is disposed in the first portion 40 of the fluid passageway 38, the valve assembly 26 prevents the non-gaseous fluid from entering the second portion 62 of the fluid passageway 38. As the non-gaseous fluid passes into the first cavity 42 of the first housing 30, the float member 90 raises and enters the first opening 104 of the first axial end portion 98*a* of the valve seat 94. The float member 90 rises until it blocks the non-gaseous fluid from entering the fluid passage 100 of the valve seat 94. With the float member 90 blocking the fluid from entering the fluid passage 100 of the valve seat 94, the non-gaseous fluid is prevented from flowing through the fluid outlet port 36*b* even though the electromechanical valve 28 is in the open position.

The valve assembly 26 of the bleed valve assembly 20 is potentially advantageous as it prevents the reservoir 12 from emptying as a result of erroneous actuation of the electromechanical valve 28 or the electromechanical valve 28 being held in the open position. While in a preferred embodiment the valve assembly 26 is positioned between the fluid sensor 24 and the electromechanical valve 28, the scope of the present disclosure is not limited to the valve assembly 26 being between the fluid sensor 24 and the electromechanical valve 28. In an alternate embodiment, the valve assembly 26 could be positioned between the electromechanical valve 28 and the fluid outlet port 36*b*. However, with the valve assembly 26 disposed between the fluid sensor 24 and the electromechanical valve 28, the valve assembly 26 keeps the electromechanical valve 28 free from contact with non-gaseous fluid which could potentially improve the life of the electromechanical valve 28.

While the bleed valve assembly 20 has been described with regard to air in the hydraulic system 10, it will be understood that the scope of the present disclosure is not limited to using the bleed valve assembly 20 in a hydraulic system as the bleed valve assembly 20 could be adapted for relieving any gaseous fluid from a non-gaseous fluid system.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A bleed valve assembly comprising:
- a control assembly having a first housing, a second housing, a fluid inlet, a fluid outlet and a passageway in fluid communication with the fluid inlet and the fluid outlet;
- an electromechanical valve disposed in the control assembly, wherein the electromechanical valve provides selective fluid communication between the passageway and the fluid outlet;
- a fluid sensor having a sensing tip in fluid communication with the passageway, the fluid sensor being in electrical communication with the electromechanical valve; and
- a valve assembly, including a float member and a float seat, disposed in the passageway of the control assembly, wherein the valve assembly prevents fluid communication of non-gaseous fluid between the fluid inlet and the fluid outlet and wherein the float seat includes a valve seat and a flange that extends outwardly from the valve seat, the flange being disposed between the first housing and the second housing.

2. A bleed valve assembly as claimed in claim 1, wherein the first housing defines a first portion of the passageway and the second housing defines a second portion of the passageway.

3. A bleed valve assembly as claimed in claim 1, wherein the sensing tip of the fluid sensor is an optical prism.

4. A bleed valve assembly as claimed in claim 1, wherein the sensing tip is at least partially disposed in the passageway.

5. A bleed valve assembly as claimed in claim 2, wherein the first housing defines a first cavity in fluid communication with the first portion of the passageway.

6. A bleed valve assembly as claimed in claim 5, wherein the first cavity has an inner diameter that is greater than an inner diameter of the first portion of the passageway.

7. A bleed valve assembly as claimed in claim 5, wherein the second housing defines a second cavity in fluid communication with the second portion of the passageway.

8. A bleed valve assembly as claimed in claim 7, wherein the second cavity has an inner diameter that is greater than an inner diameter of the second portion of the passageway.

9. A bleed valve assembly for a hydraulic system comprising:
- a control assembly having a fluid inlet and a fluid outlet and including a first housing and a second housing, the first and second housings cooperatively defining a passageway in fluid communication with the fluid inlet and the fluid outlet, wherein the first housing defines a first portion of the passageway and the second housing defines a second portion of the passageway;
- a fluid sensor disposed in the first housing having a sensing tip at least partially disposed in the first portion of the passageway;
- a solenoid valve disposed in the second housing, wherein the solenoid valve includes an armature that is selectively disposed in the second portion of the passageway for providing selective fluid communication between the passageway and the fluid outlet; and
- a valve assembly disposed between the first housing and the second housing, the valve assembly including a float member and a valve seat having a fluid passage through the valve seat, the valve assembly having a flange that extends outwardly from the valve seat, the flange being disposed between the first housing and the second housing, the float member being adapted to prevent non-gaseous fluid from contacting the solenoid valve by blocking the flow of non-gaseous fluid through the fluid passage of the valve seat.

10. A bleed valve assembly as claimed in claim 9, wherein the float member is a hollow bodied generally spherical member.

11. A bleed valve assembly as claimed in claim 9, wherein the fluid sensor is an electro-optic sensor.

12. A bleed valve assembly as claimed in claim 11, wherein the sensing tip of the electro-optic sensor is an optical prism.

13. A bleed valve assembly as claimed in claim 12, wherein the electro-optic sensor includes a body defining an inner cavity with a light source, a light receiver and a microprocessor disposed in the inner cavity.

14. A hydraulic system comprising:
- a fluid reservoir;
- a passageway in fluid communication with an upper portion of the fluid reservoir;
- a fluid sensor having a sensing tip in fluid communication with the passageway, the fluid sensor being disposed downstream of the fluid reservoir;
- an electromechanical valve disposed downstream of the fluid sensor, the electromechanical valve having an armature selectively disposed in the passageway, the armature being adapted to selectively vent gaseous fluid in the passageway in response to an electrical signal from the fluid sensor; and
- a back-up valve assembly disposed in the passageway between the fluid sensor and the electromechanical valve, the back-up valve assembly including a valve seat and a float member, wherein the valve seat and float member are adapted to prevent non-gaseous fluid from flowing downstream of the back-up valve assembly and;

a first housing in engagement with the fluid sensor and a second housing in engagement with the electromechanical valve, wherein the back-up valve assembly has a flange that extends outwardly from the valve seat, the flange being disposed between the first housing and the second housing.

15. A hydraulic system as claimed in claim 14, wherein the fluid sensor is an electro-optic sensor including a body defining an inner cavity, the electro-optic sensor having a light source, a light receiver and a microprocessor disposed in the inner cavity.

16. A bleed valve assembly comprising:

a control assembly having a passageway extending between a fluid inlet and a fluid outlet;

an electromechanical valve disposed in the control assembly, wherein the electromechanical valve is positionable between a closed position, wherein the fluid outlet is blocked from the passageway, and an open position, wherein the fluid outlet is in fluid communication with the passageway;

a fluid sensor having a sensing tip in fluid communication with the passageway, the fluid sensor being in electrical communication with the electromechanical valve; and a mechanical valve assembly located in the passageway between the electromechanical valve and the fluid sensor, the mechanical valve assembly including a float member and a float seat adapted to prevent non-gaseous fluid from contacting the solenoid valve by blocking the flow of non-gaseous fluid through the passageway;

wherein, when a non-gaseous fluid is in the passageway and in contact with the fluid sensor and the mechanical valve assembly, the non-gaseous fluid is sensed by the fluid sensor and prevented from contacting the electromechanical valve by operation of the mechanical valve assembly;

wherein the electromechanical valve and the mechanical valve are actuated along a common axis.

17. The bleed valve assembly of claim 16, wherein the electromechanical valve is spring biased to the closed position in an unpowered state, and wherein the electromechanical valve is actuated to the open position in a powered state when the fluid sensor fails to detect a non-gaseous fluid.

18. The bleed valve assembly of claim 16, further comprising a first housing piece in which the fluid sensor is mounted and a second housing piece in which the electromechanical valve is mounted, and wherein the mechanical valve assembly is mounted between the first and second housing pieces.

19. The bleed valve assembly of claim 16, wherein the sensing tip of the fluid sensor is aligned along a sensor axis that is perpendicular to the common axis.

20. A bleed valve assembly for a hydraulic system comprising:

a control assembly having a fluid inlet and a fluid outlet and including a first housing piece and a second housing piece, the first and second housing pieces cooperatively defining a passageway in fluid communication with the fluid inlet and the fluid outlet, wherein the first housing piece defines a first portion of the passageway and the second housing piece defines a second portion of the passageway;

a fluid sensor mounted in the first housing piece having a sensing tip at least partially disposed in the first portion of the passageway;

an electromechanical valve mounted in the second housing piece and in electrical communication with the fluid sensor, wherein the electromechanical valve is positionable between a closed position wherein the fluid outlet is blocked from the passageway, and an open position wherein the fluid outlet is in fluid communication with the passageway, the electromechanical valve being spring biased to the closed position in an unpowered state, and actuatable to the open position in a powered state when the fluid sensor fails to detect a non-gaseous fluid; and a mechanical valve assembly mounted between the first and second housing pieces and between the fluid sensor and the electromechanical valve, the mechanical valve assembly including a float member and a valve seat having a fluid passage through the valve seat, the float member being adapted to prevent non-gaseous fluid from contacting the solenoid valve by blocking the flow of non-gaseous fluid through the fluid passage of the valve seat;

wherein, when a non-gaseous fluid is in the passageway, and in contact with the fluid sensor and the mechanical valve assembly, the non-gaseous fluid is sensed by the fluid sensor and prevented from contacting the electromechanical valve by operation of the mechanical valve assembly.

21. The bleed valve assembly 20, wherein the electromechanical valve and the mechanical valve are actuated along a common axis.

22. The bleed valve assembly of claim 20, wherein the sensing tip of the fluid sensor is aligned along a sensor axis that is perpendicular to the common axis.

* * * * *